Jan. 17, 1956  A. HALE ET AL  2,730,755
CONTINUOUS MILL
Filed Jan. 7, 1953  10 Sheets-Sheet 4

FIG. 4

INVENTORS
ANDREW HALE &
BY BOYD A. McCLELLAN

ATTORNEYS

FIG. 5

INVENTORS
ANDREW HALE &
BOYD A. McCLELLAN
BY Ely, Frye & Hamilton
ATTORNEYS

Jan. 17, 1956  A. HALE ET AL  2,730,755
CONTINUOUS MILL
Filed Jan. 7, 1953  10 Sheets-Sheet 6

INVENTORS
ANDREW HALE &
BOYD A. McCLELLAN
BY Ely, Frye & Hamilton
ATTORNEYS

Jan. 17, 1956

A. HALE ET AL 2,730,755

CONTINUOUS MILL

Filed Jan. 7, 1953

INVENTORS
ANDREW HALE &
BY BOYD A. McCLELLAN

ATTORNEYS

United States Patent Office 2,730,755
Patented Jan. 17, 1956

2,730,755

CONTINUOUS MILL

Andrew Hale, Akron, and Boyd A. McClellan, Mogadore, Ohio, assignors, by mesne assignments, to the Aetna-Standard Engineering Company, Youngstown, Ohio, a corporation of Ohio Application January 7, 1953, Serial No. 330,019

16 Claims. (Cl. 18—2)

The present invention relates to a new and improved mill for the processing of rubber, including natural, synthetic and reclaimed rubbers or mixtures thereof. It is also used in the processing of artificial resins and other synthetic plastic materials which are milled in substantially the same manner as rubber.

It is the object of this invention to design a mill on which plastic material will be given an intensive and complete working in a single operation through the mill, thus avoiding separate milling operations and intermediate aging operations which are commonly used in preparing rubber or synthetic plastics. In the milling of rubber, for example, the batch of rubber which has been given the usual compounding treatment in a Banbury type mixer is taken directly to the improved mill, where it is given a succession of milling operations which thoroughly break it down, disperse the compounding ingredients, and plasticize the rubber so that it may go directly to the tubing mill or calender without any other operation. In another aspect of the invention, cold rubber or plastics, which may be pelletized, are fed to the mill at one point and delivered as fully milled strips at another point.

One of the objects of the invention is to construct a mill which will thoroughly work the stock as it moves in a continuous manner through the mill and will do so while the stock is comparatively cool. It has been found that to obtain the most efficient milling operation, the temperature of the rubber should be between approximately 160° and 180° F. because temperatures in or about that range give the most effective shearing action. In the milling of synthetic resins such as polyethylene which requires extensive milling in order to render it transparent, temperatures between 90° and 120° C. are employed to achieve the most efficient shearing operation. Should, in the case of rubber or in the case of synthetic resins, the temperatures of the stock on the mill increase substantially above the prescribed temperatures, the stock becomes too soft and fluid to work properly on the mill because there is little or no shearing action. Likewise, if the stock does not come up to the required temperatures the milling is not as efficient.

In the intensive working of any plastic material on a mill the material will heat up by the forces exerted upon it and the mill rolls should be cooled to keep the temperature down. In the operation of the mill shown and described herein the temperature of the stock is further kept under control by reason of the fact that it is worked in thin sheets which are exposed so that much heat is dissipated by direct radiation. This is an important feature of the invention because the stock receives a much more concentrated and vigorous working than on the ordinary mill.

In spite of the fact that in the mill of this invention the rubber or synthetic resin is most vigorously, thoroughly and repeatedly worked during the period that it takes to pass through the mill, the stock is kept at the optimum temperatures for the best and most efficient shearing action.

It is a further purpose of the invention to provide a mill which is automatic in operation. The rubber or plastic is fed into one end of the mill and issues at the other end as a thoroughly milled and plasticized product in which the compounding ingredients are thoroughly and uniformly dispersed. This eliminates the manual labor which has heretofore been used in tending a mill and avoids the irregularity and non-uniformity which is attributable to the workmen on the mill.

It is also one of the objects and advantages of the present invention to construct a mill which can be operated at several times the speed at which the ordinary mill operates. This can be accomplished because the heat generated in the stock is much more readily dissipated. The automatic operation makes it possible to use such high speeds because no manual operations are required. Conversely, it would be impractical to operate a mill at such high speeds unless the operations were automatic because hand operation at such speeds would be too dangerous.

It is a further object of the invention to provide a mill which is equally effective for the milling of all types of rubber and synthetic resins.

In the accompanying drawings, there is shown a continuous mill embodying this invention. It is adaptable for milling of synthetic resins, certain parts of the apparatus being modified for this particular material, as will be explained. It will be understood that the drawings and description disclose the best known and preferred forms of the invention in such detail as will enable the invention to be understood and operated by those skilled in the art. However, changes, modifications and improvements may be made which do not depart from the basic principles of the invention, as more particularly set forth in the claims.

The invention consists primarily in the provision of a mill comprising the usual pair of rolls on which the rubber or plastic material is worked in the bight between the two rolls. One of said rolls, usually called the work roll, is equipped with a plurality of knives which cut the stock into a number of strips which are then rolled upon themselves from one edge thereof by plows or turning blades. From the plows the strips pass into a space between the surface of the work roll and rollers which are located with their working faces parallel to the surface of the work roll. These rollers, which may be termed "coiling rollers," take the edge of the strip as it has been started by the plows and roll it upon itself to form a tight coil of the stock, which is carried by the rotation of the work roll axially into the bight. As there are several of these sets of knives, plows and coiling rollers along the work roll, the stock is repeatedly coiled upon itself and introduced endwise into the bank of stock at the bight where it is again reworked.

It will be understood that the stock to be milled is introduced at one end or side of the mill, where it is first sheeted, and as the stock reaches each set of coiling devices it is formed into the coil referred to. As the mill continues to rotate the stock is advanced progressively along the mill, being successively formed into coils during its progress. The coiling of the stock helps to blend the stock and advance it along the roll.

Four sets of slitting and coiling devices are shown in the drawings as this number has been found to achieve successful results, but the number of sets may be increased or diminished. There are also provided at the ends of the mill, plows and coiling rollers which act upon the edges of the stock during its first and last passes through the mill, respectively.

In the milling of the various types of rubber certain features are required which are not necessary for other types of rubber, and in the milling of synthetic resins other features will be employed which are not necessary for rubber. The mill shown here has all of the features required to process any stock, it being understood that features not required for a particular stock may be omitted without departing from the invention.

Figure 4:
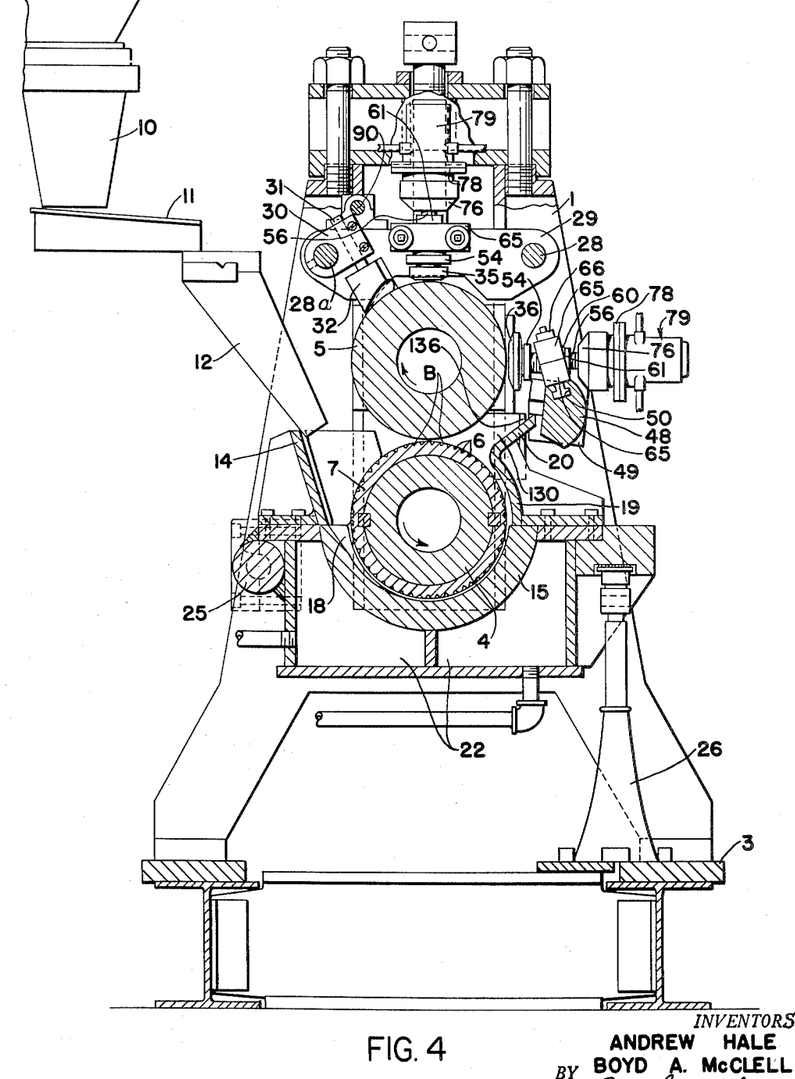
Fig. 4 is a vertical section on the line 4—4 of Fig. 2.

The mill has two end frames, that at the end or side of the mill where the stock is introduced being given the reference numeral 1 and the end frame at the take-off side of the mill being given the reference numeral 2. The frames are supported upon any suitable foundation such as shown at 3 in Fig. 4. The lower or feed roll is indicated at 4 and the upper or work roll at 5. The rolls are adjustable with respect to one another to vary the opening between the rolls at the bight. In the operation of this mill the opening is narrower than in the ordinary mill operation so that the stock as it issues from the bight is thinner than customary. The rolls are cored or drilled out as is customary for the circulation of heating or cooling water in accordance with usual practices. At the point where the stock is fed into the mill, the feed roll is shown as provided with a plurality of longitudinal grooves 6 located in the feed-in section of the feed roll. If desired, these grooves may be formed in a jacket 7 fitted over and keyed to a reduced section of the feed roll.

The purpose of the grooves 6 is to assist in the feeding-in operation, particularly in processing natural rubber. Rubber may be brought to the mill in strip form, but it is frequently brought to the mill in pellet form, and while synthetic rubbers will be caught by a smooth feed roll and fed into the machine, pellets of natural rubber tend to turn over and over rather than cling to and follow the feed roll. If the feed roll is grooved as shown, rubber pellets will be caught by the feed roll and be carried to the bight, where they amalgamate in sheet form and transfer to the work roll. The grooves may be omitted if the mill is to be used for synthetic resins.

The rolls 4 and 5 are driven in the direction of the arrows shown in the several views by standard gear drive from the motor M and standard gear transmission, the top or work roll being usually driven faster than the lower roll which causes the sheet of stock to accumulate in a bank at the bight B so as to effect the shearing during its passage through the rolls. In the case of rubber, this bank is the well known rolling bank, the size of which is determined by the amount of rubber introduced into the mill and the spacing of the rolls. Usually what is known in the art as a "pencil bank," from its size, achieves the most efficient milling and is the size of bank which a good mill operator seeks to maintain. In the case of synthetic resins, the bank is more apt to appear in somewhat the form shown in Fig. 15.

The temperatures of the rolls 4 and 5 may vary with the particular stocks. In the case of natural rubber, it is advisable to run the upper or work roll cooler than the bottom roll. In the case of synthetic rubber the upper roll should be warmer than the lower roll. In the case of polyethylene, which is a commonly used synthetic resin, the top and bottom rolls should be the same temperature. These matters are controlled for the particular stock by water or steam circulating through the rolls. For certain types of synthetic resins it may be desirable to maintain the rolls somewhat warmer at the feed-in point than over the balance of the mill. This may be done by providing different circulating systems for the different sections of the rolls.

The factors of temperatures and roll speeds are important in this mill because of the intensive working which the stock receives.

In case the stock is received in pellet or particle form, it is delivered to the mill from a hopper 10 which deposits the pellets or particles on a feed conveyor, usually of the vibrating table type indicated at 11, which feeds the stock into a chute 12 at a measured rate. The particles or pellets fall into a three-sided feed box 14 which is located at the rear of the mill and fits around an upper section of the roll 4 at the feeding area. The box is removably fastened to the upper side of a casement 15 which surrounds the lower side of the roll 4 and extends for any desirable distance along the lower roll. At the feed box the casement is relieved as shown at 18 to provide a throat into which the pellets of stock fall and by which they are drawn onto the surface of the roll. Except at this point the casement follows closely around the contour of the roll 4.

The principal function of the casement is to give a severe and concentrated working to the cold rubber so as to soften it and prepare it for the action which it receives when it reaches the bight. The casement also serves to hold the pellets against the surface of the roll while they are reduced in thickness and elongated and rolled about between the casement and the roll 4 until the pellets form small thin rolls which are intensively worked as they tend to follow the roll 4. To hold the pellets against the roll 4 until they reach the bight, a guard piece 19 is mounted on the casement at some distance from the surface of the roll so that the rubber is not further worked above the center line of the roll. An extension 20 on the guard piece serves to catch any particles which fall from the sheet of stock on the roll 5 and return the particles to the roll 4.

Figure 6:
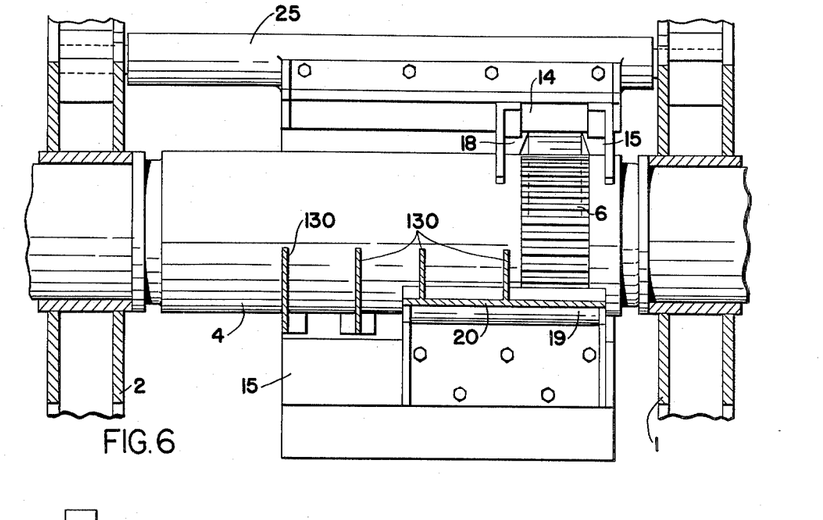
Fig. 6 is a plan view of the lower mill roll on the line 6—6 of Fig. 5.

Considerable heat is generated by the passage of the stock through the space between the casement and the work roll and in order to keep the stock from scorching, the casement is jacketed as shown at 22 and cooling water is circulated through the casement to the extent required to maintain the optimum temperature in the stock. In order to be able to clean out the casement at intervals, the casement is welded to a shaft 25 which extends across the rear of the mill and is journaled in the end frames 1 and 2 as shown in Fig. 6. One or more jacks 26, resting upon the foundation 3, support the casement in its elevated position and, being adjustable, allow for variations in the spacing between the casement and the lower roll to regulate the amount of working which the stock receives between the roll 4 and the casement.

As the stock is fed into the mill, it is kneaded by its passage between the lower roll and the casement and at the bight between the two mill rolls until it forms a coherent sheet which wraps about the upper roll 5. When the mill has been in operation for a short time, the entire upper roll will be covered by the sheet and the stock will be gradually progressed along the roll 5 by the mechanism to be described.

Figure 1:
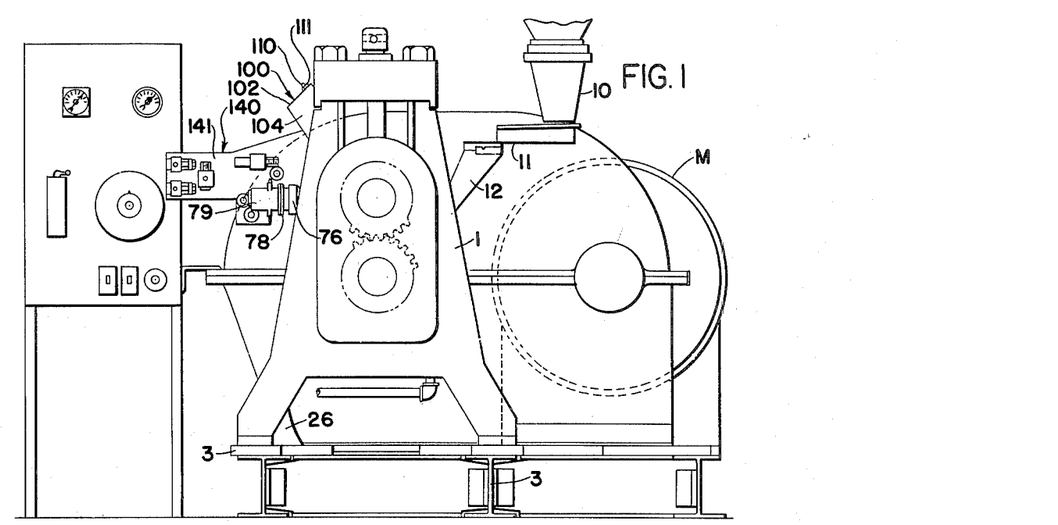
Fig. 1 is a side elevation of the improved mill. It is shown with a control board and with a take-off mechanism such as used to convey a strip of the completely milled rubber from the mill.
Figure 2:
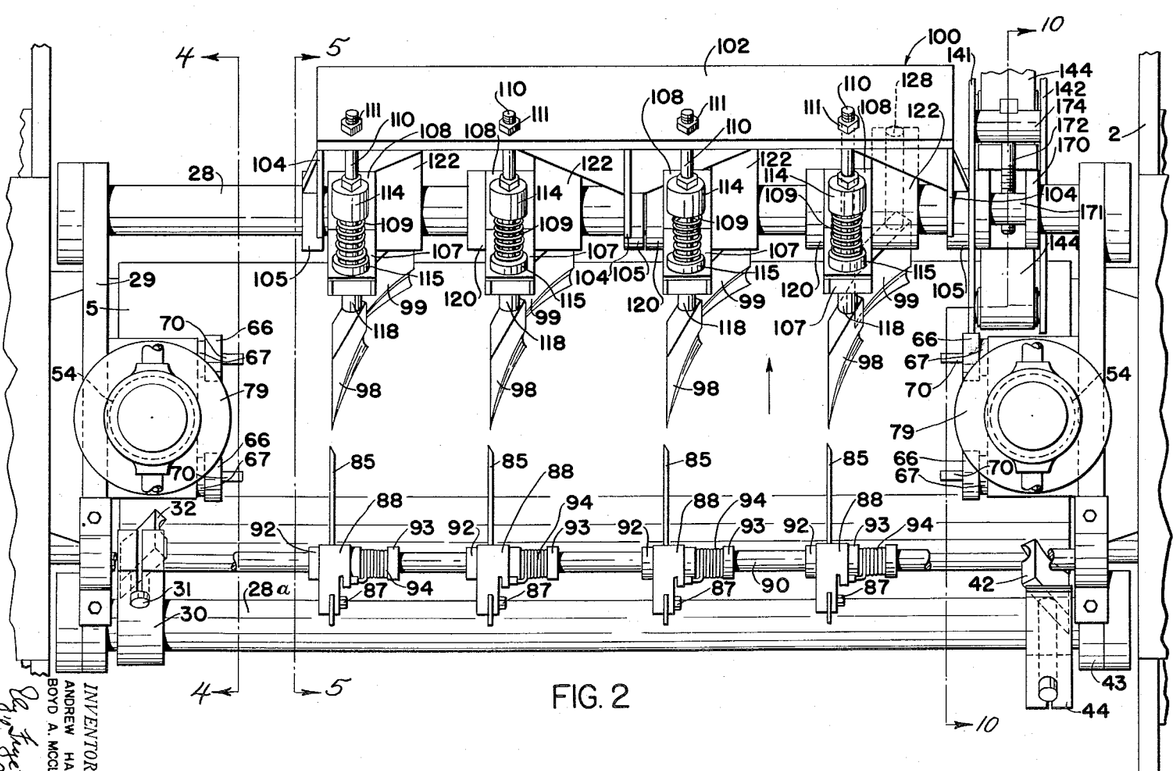
Fig. 2 is a plan view looking at the top of the mill.
Figure 3:
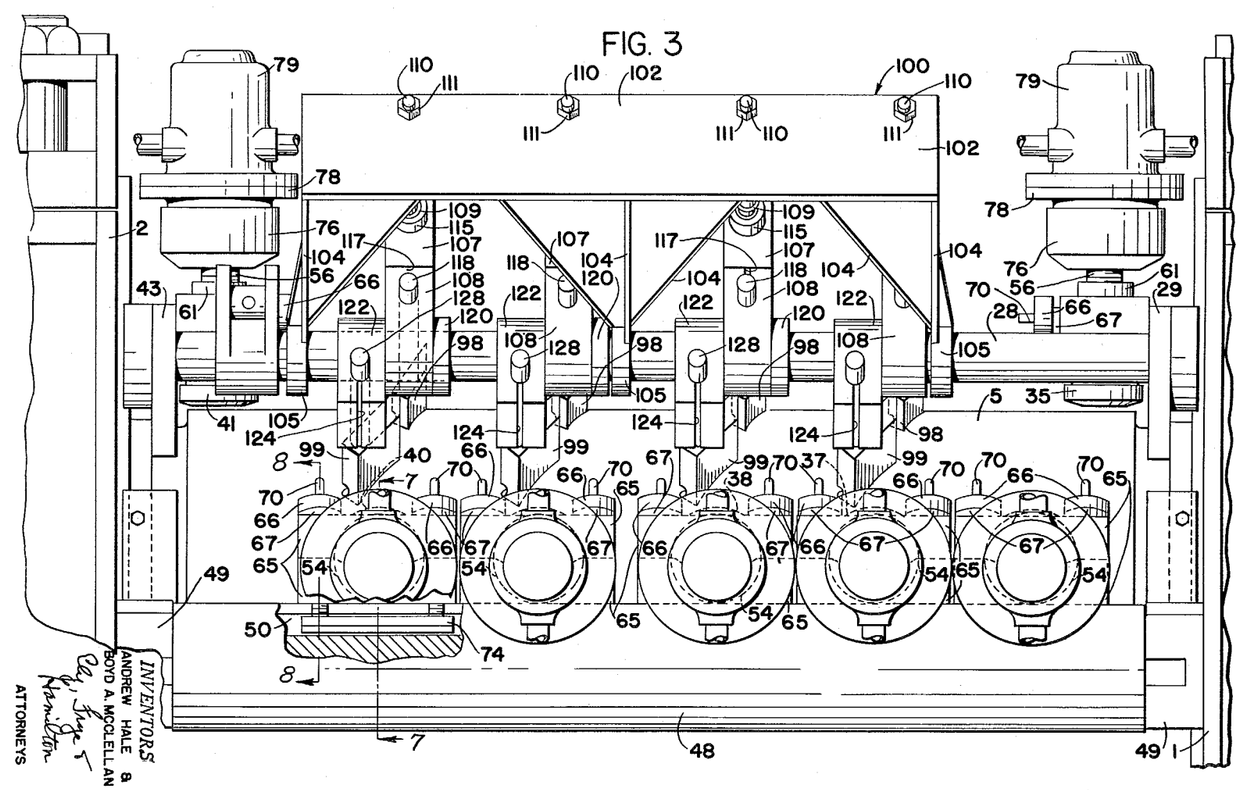
Fig. 3 is a side elevation, the location of the view being shown by the dotted line 3—3 of Fig. 5.

Extending across the mill between the two end frames are parallel shafts 28 and 28a, 28 indicating the shaft on the front of the mill, and 28a the shaft at the rear of the mill. Supported on these shafts adjacent the end frame 1 is a plate or bracket 29. Located on the shaft 28a adjacent the plate 29 and clamped on the shaft is a bracket 30, the side of which is split and provided with tightening bolts to receive the stem 31 of a shoe or plow 32. The lower edge of the plow is curved to fit closely against the surface of the roll 5, close to the edge thereof. As shown in Fig. 2, the plow is set at an angle to the axis of the roll 5 and the lower edge thereof is scooped or curved as shown, so that the plow picks up the edge of the stock as it moves upwardly from the bight B and starts the first coiling operation on the sheet.

In order to complete the first coil and to insure that the stock will roll upon itself a number of times before it reaches the bight, a coiling roller 35 is fixed to the bracket 29 directly above the upper roll 5 and spaced at a slight distance therefrom. The roller 35 is somewhat smaller in diameter than the main coiling rollers at the front of the mill, but it is mounted and driven in the same manner and the description of that part of the mechanism will be deferred. As shown, the roller has a flat central working surface, which is spaced a slight distance from the face of the roll 5, and a beveled edge portion which allows the edge of the stock to roll upon itself. All of the coiling rollers are similarly formed. As graphically shown in Figs. 14 and 15, the roll 35 picks up the edge of the stock which has been started coiling by the plow 32 and forces it to continue to roll upon itself, and it further acts to start the stock in its progression along the mill and prevents any stock from passing off the end of the roll.

After leaving the coiling roller 35, the stock is again picked up by the second coiling roller 36, which as shown is somewhat larger than the roller 35 but is correspondingly shaped. This roller 36 is located approximately on the plane of the axis of the roll 5, and it imparts a further coiling operation to the edge of the stock so that the coil of stock is presented substantially endwise to the bight.

Figure 14:
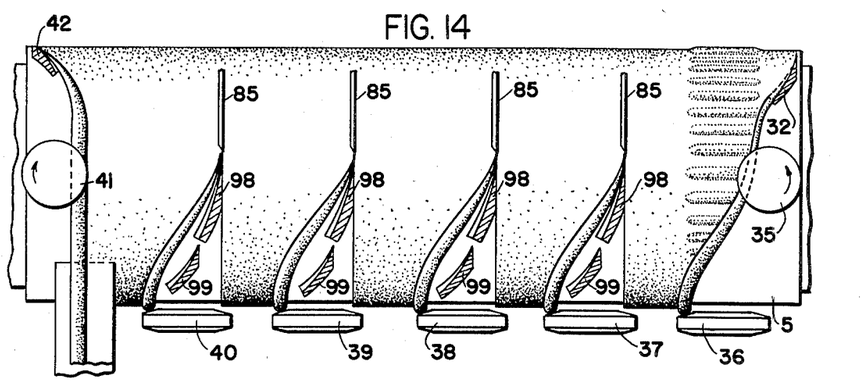
Fig. 14 is a schematic view showing the behavior of the stock on the upper mill roll.
Figure 15:
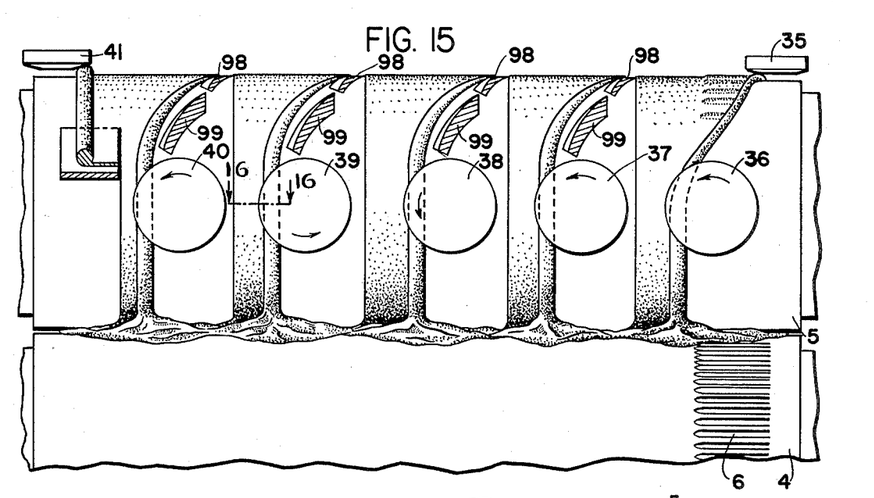
Fig. 15 is a side view corresponding to Fig. 14.

The other main coiling rollers are given the numerals 37, 38, 39 and 40, from right to left, as shown in Figs. 14 and 15. They are the same in construction and design as the roller 36. At the delivery end of the mill, over the roll 5, is a final coiling roller 41, which picks up the far edge of the stock after it has been turned over by a plow 42, similar to the plow 32. The roller 41 is mounted similarly to the roller 35 on a bracket 43 on the end frame 2 and the plow is carried by a clamping bracket 44.

Figure 7:
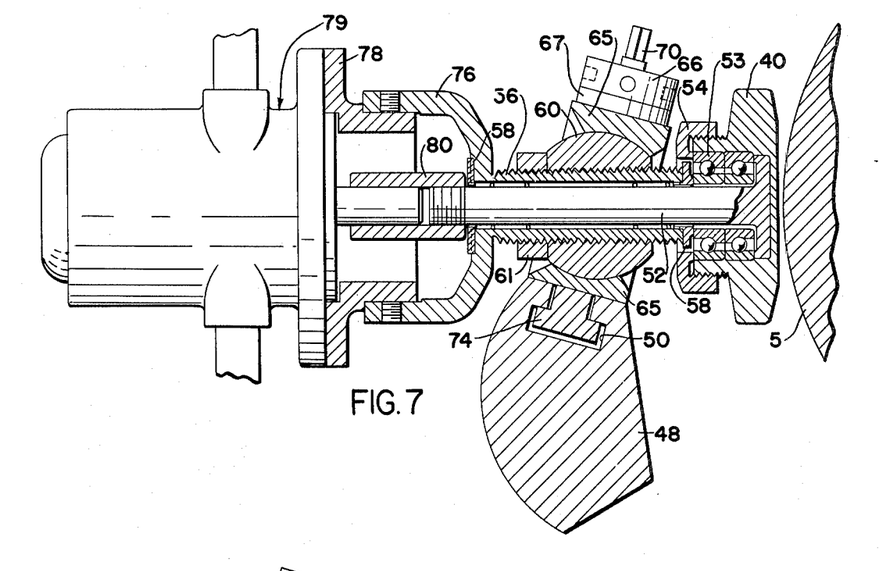
Fig. 7 is a detailed view of one of the rollers which roll the stock into the coil in the manner characteristic of the mill, the location of the view being indicated by the line 7—7 of Fig. 3.
Figure 8:
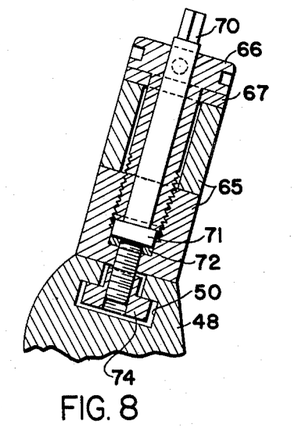
Fig. 8 is a section on the line 8—8 of Fig. 3.
Figure 16:
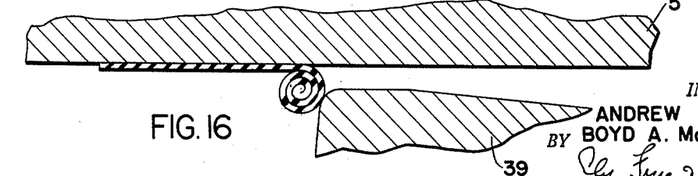
Fig. 16 is an enlarged view taken on the line 16—16 of Fig. 15 and showing a slight modification which may be employed if found desirable.

The several main coiling rolls are supported on a beam 48 which extends across the front of the mill and is carried on blocks 49 attached to the end frames. The upper side of the beam is provided with a T-shaped channel 50. Referring to Figs. 7 and 8, which is illustrative of the several main coiling rollers, the roller 40 is rotatably mounted on the end of a spindle 52 through ball bearings 53 held in place by a screw threaded cap 54. The spindle is rotatably mounted in a hollow shaft 56 through bearings 58. The shaft 56 is exteriorly threaded into a ball shaped bearing member 60 and held in position by a lock nut 61. The bearing member 60 is located in a spherical recess formed in the opposing faces of the two sections of a split block 65. The two-part block 65 extends to either side of the spherical bearing and is held together about the bearing member by headed bolt 66 which is threaded in the lower block section and bears against the top block section through a washer 67. In this way it is possible to adjust each large coiling roller so that the plane of its working face is at the best angle with respect to the face of the work roll 5 to perform the function of rolling the strip of stock upon itself. While the rolls may work satisfactorily with the axis of the spindle 52 at right angles to the axis of roll 5, it may be desirable to have the coiling rollers at a slight angle to the face of the work roll so that the side of each coiling roller in the direction of the movement of the stock is nearer to the work roll. This is shown on an exaggerated scale in Fig. 16. It has been found that sometimes the coil as it approaches the coiling roller may thrash about and get on the opposite side of the axis of the spindle 52, which would present the coil to the upwardly moving side of the roller. If the roller is freely movable this would upset the operation of the mill. By tilting the axis of the roller the coil of stock does not tend to be caught between the face of the coiling roller and the work roll even if it shifts too far toward the right. It is also possible to vary the position of the spindle so that the axis of the spindle is not on the radius of the work roll. The end face of the coiling roller should be in substantial parallelism with the surface of the work roll. Where the expression "parallelism" is used to express the relationship between the face of the coiling roll and the adjacent surface of the work roll, it will be understood that a slight deviation from exact parallelism is not excluded.

Through the center of each bolt 66 on each block is a long set screw 70 having a collar 71 bearing against a washer 72 located in the lower block section below the end of the bolt 66. The lower end of the screw 70 is threaded into a T-shaped nut 74 located in the slot 50. In this manner the several blocks carrying the main coiling roller may be adjusted along the beam 48 as found desirable.

The several coiling rollers, including the two auxiliary rollers 35 and 41, may be mounted for free rotation so that these are driven by the stock itself as it is carried forward by the work roll 5. The coiling rollers may also be yieldingly mounted to give slightly along the axis of the roller.

It has been found, however, that the most satisfactory results are obtained without any yielding movement of the rollers and by positively driving the several rollers and particularly the main coiling rollers 36–40, inclusive. If the rollers are driven the stock is compelled to form into the spiral coils illustrated in the drawings and progress through the mill in the right direction. While in the drawings all of the rollers are shown as equipped with power drives, this is not essential, as stated above.

Referring to Fig. 7, which is typical of all the coiling rollers, each hollow shaft 56 is formed at its outer end with a large cup 76 to which is fastened a bearing block 78 on which is supported a motor 79 to drive the coiling roller to which it is attached through a coupling sleeve 80 connecting the shaft of the motor with the spindle of the coiling roller. It is preferred to use any of the standard fluid operated motors as it is possible to drive such a motor at the slow speed required for direct coupling to the spindle 52. Each motor is to be driven at an axial speed which will produce a surface speed in the beveled edge areas which is comparable to or slightly faster than the surface speed of the work roll 5 so that the rubber will be rolled evenly upon itself.

The four centrally located coiling rollers 37 to 40 inclusive act on the intermediate portion of the sheet as it is carried toward the bight by the rotation of the work roll. For each roll there is a set of slitting and turning devices to start a coil of stock which is completed by the said coiling roller and delivered endwise to the bight as the tight coil of stock shown in Fig. 15.

The first instrumentality of each set is a slitting knife 85, four of these being provided as shown in Fig. 2, each being located to the right of its coiling roller. Each knife has a long handle provided with a plurality of holes 86 by which it is held through a bolt 87 in a bracket 88 in the most efficient position so that the cutting edge thereof will rest upon the work roll 5 to slit the stock for the coiling operation. The several brackets 88 are rotatably mounted on a shaft 90 extending across the rear of the mill and each bracket is held in position between collars 92 and 93 fixed to the shaft. To cause the cutting blade of the knife to bear against the roll, a coil spring 94 is wrapped about the shaft 90, one end being held on a collar 93 and the other connected to the bracket 88.

The knives 85 slit the rubber near the top of the work roll. In the space between the knives and the coiling rollers there is located means for starting the coiling operation on the edge of each strip of stock. In the form of the invention shown herein, for each knife and coiling roller there are two plows, the first of which is given the reference numeral 98 and the second the numeral 99. Each plow fits closely against the curvature of the work roll and is scooped out to turn the stock over upon itself. The first plow is set at a less acute angle to the stock than the second, as shown in Fig. 14. The second plow is useful principally in starting the mill in operation, for once the coil of stock is properly seized by the main coiling roller it will usually continue to roll upon itself without the aid of the plow 99. In certain plastics which roll easily and are not too "lively," the operation, once started, will continue smoothly and without hitch. In more lively stocks the coils may tend to thrash around and the plow 99 will aid in preventing them from getting out of proper place. It is possible, therefore, to dispense with the plows 99, but to insure the least attention to the mill they should be provided.

The plows are supported by a frame which is given the general reference numeral 100. The frame comprises an upper plate 102 which is located above the work roll at the front of the mill, being supported so that it is at an angle to the vertical by a plurality of braces 104 which are welded to collars 105 keyed to the shaft 28 at 106. Rotatably mounted on the shaft 28 in alignment with each coiling roller 37—40, is a bracket 108 which extends upwardly from the shaft. The outer end of the bracket is attached to an angle iron end piece 107 which is yieldingly pressed toward the work roll so that the leading point of the plow bears upon the work roll, by a coil spring 109 which surrounds a pin 110 fixed in the plate 102 by lock nuts 111 and passing at its lower end through a hole in the end piece 107. An adjustable cap 114 on the pin 110 and a bearing block 115 resting against the end piece 107 transmit the pressure of the spring to the bracket and thence to the plow 98.

Figure 9:
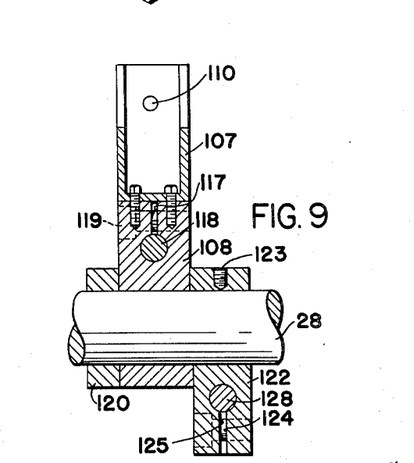
Fig. 9 is a section on the line 9—9 of Fig. 5 taken through the support for the plows.

The end of the bracket 108 is split as shown at 117 in Fig. 9 to receive the stem 118 to the lower end of which the plow 98 is welded, bolts 119 clamping the stem in position. A collar 120 is fixed to the shaft 28 at one side of the bracket 108.

On the other side of the bracket 108 is a second bracket 122 which is fixed to the shaft by set screw 123. The bracket 122 is split at 124 and held together by bolts 125 to clamp the stem 128 of the second plow 99 with the leading point of the plow bearing upon the work roll.

It will be seen that after the stock has been sheeted about the work roll 5 at the feed-in end of the mill, it is successively slit by the knives 85 and then coiled upon itself by the action of the plows and the coiling rollers. This presents the stock in successive coils projected endwise into the bight, where the coils meet the bank which is being milled about at the bight. In this way the stock progresses through the mill, being worked repeatedly without any attention on the part of the operator. While four sets of coiling instrumentalities are shown between the feed-in point and the take-off point, the number of sets may be increased or diminished, depending upon the amount of work sought to be done on any particular stock.

Figure 5:
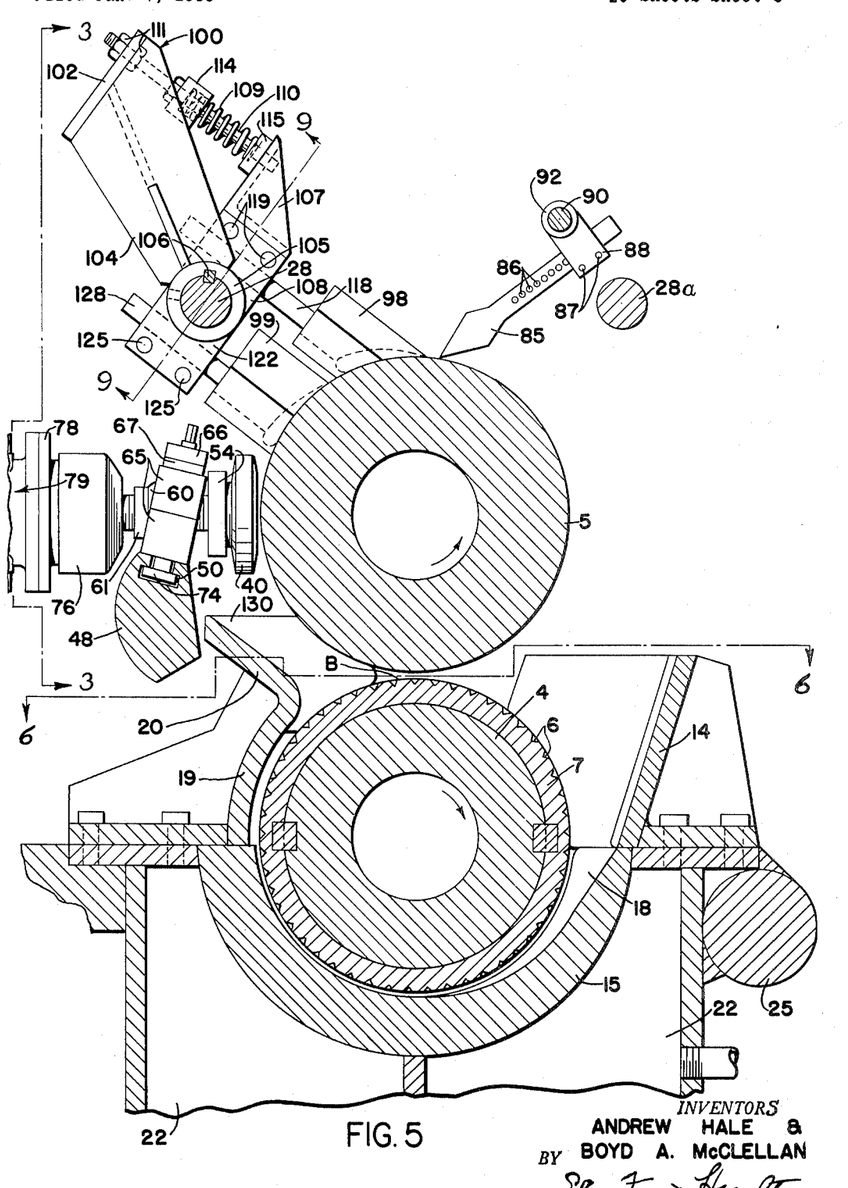
Fig. 5 is a vertical section on the line 5—5 of Fig. 2.

In most operations the stock will pass regularly through the cycle, but in other cases, particularly in dealing with synthetic resins, the stock may tend to migrate along the bank rather than being caught up and passed through the bight at each pass. To guard against such as occurrence and to assist in advancing the stock along the mill, it is desirable to provide dams or baffles at intervals along the bight which will project almost to the bight itself, and these will prevent migration of the stock along the bight. Dams or baffles 130 for the purpose described are shown in Figs. 5 and 6 as formed either as a part of the wing 20 or secured to the top of the casement 15. These dams are located between each pair of coiling rollers and thus isolate each part of the stock being operated upon by a coiling roller from the stock being operated upon by other coiling rollers.

The stock having progressed to the far or delivery end of the mill, is now ready to be removed as a continuous strip from the roll 5. At the end of the work roll the far edge of the stock is lifted by the plow 42 and given a brief coiling treatment by the coiling roll 41 previously described.

Figure 10:
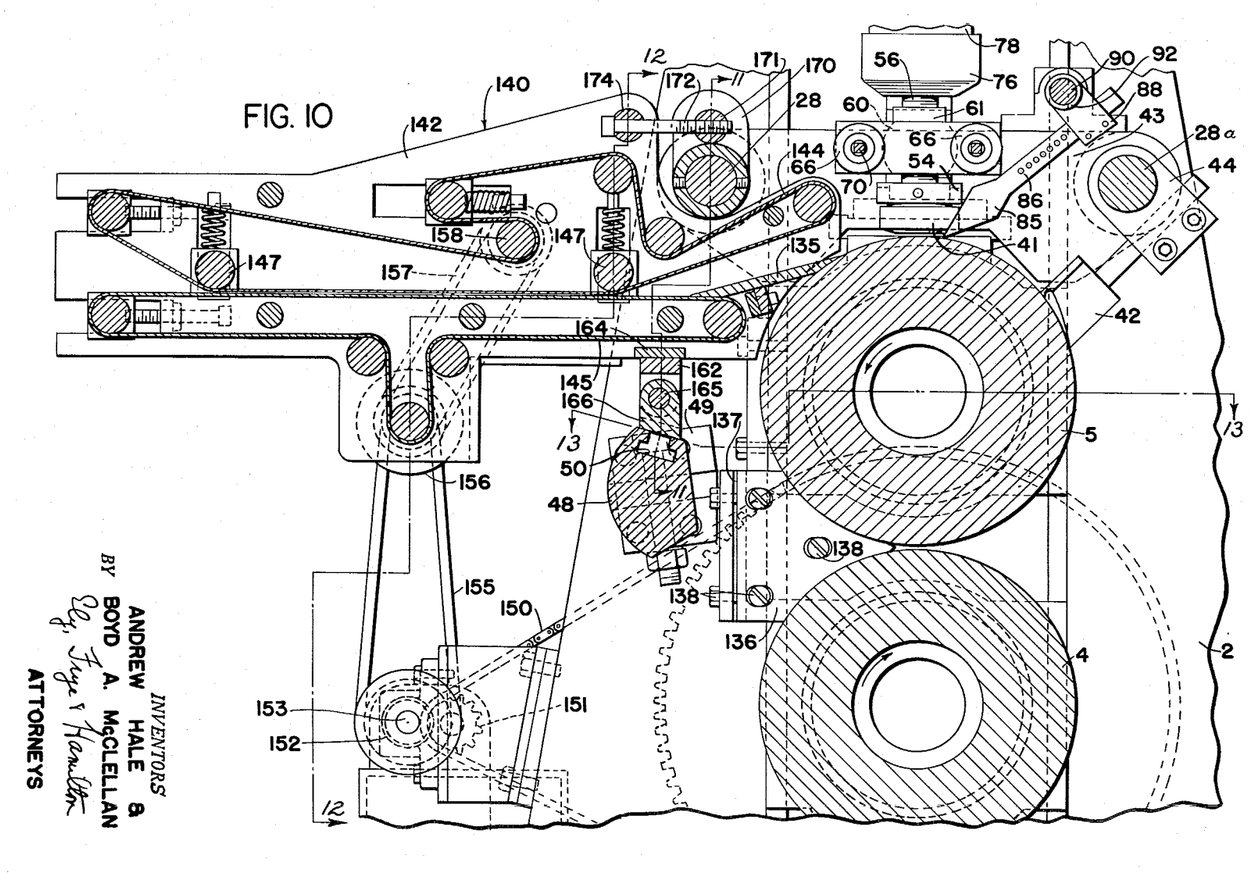
Fig. 10 is a vertical section on the line 10—10 of Fig. 2 which is at the take-off side of the mill.
Figures 11, 12:
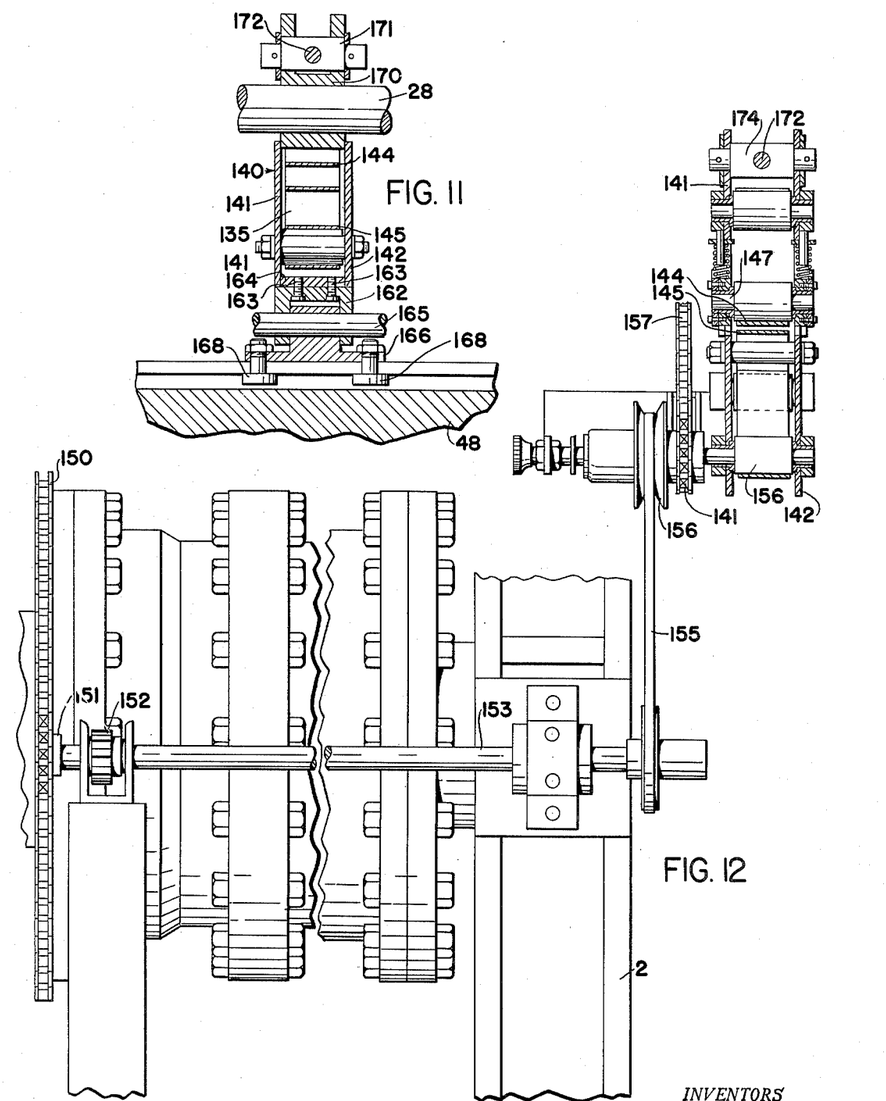
Fig. 11 is a section on the line 11—11 of Fig. 10.
Fig. 12 is a section on the line 12—12 of Fig. 10.
Figure 13:
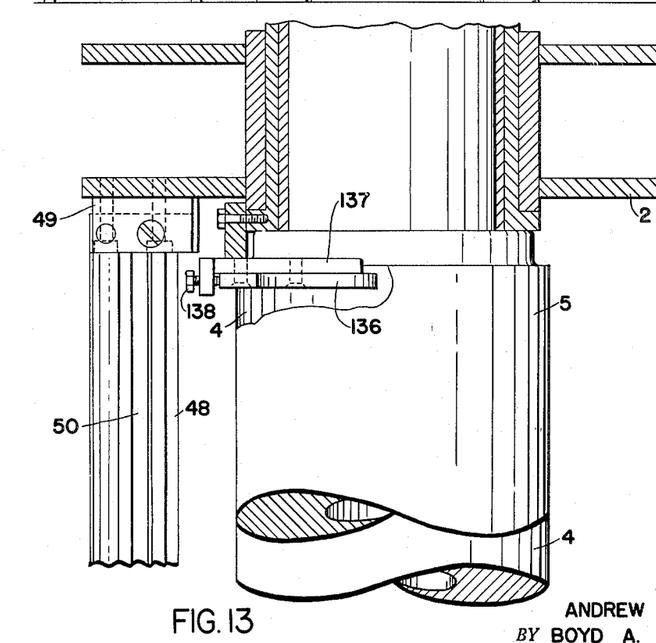
Fig. 13 is a detail at the take-off side of the mill, the view being taken on the line 13—13 of Fig. 10.

The stock is now stripped from the work roll by the stripping plate shown at 135 in Fig. 10. In the case of rubber, it is desirable to withdraw the finished stock by a pair of belts of a take-off mechanism, the details of which are shown in Figs. 10, 11 and 12. At the discharge end of the mill, at the bight, there is mounted a plate 136 which fits the space between the rolls and prevents the stock from passing beyond that point. The plate is adjustably secured to a second plate 137 and is held in place by set screws 138. Plate 137 is attached to the end frame 2 as shown in Fig. 13.

The take-off unit comprises a frame indicated as a whole at 140 which is made of two parallel vertical plates 141 and 142 which are of the outline shown in Fig. 10. Those plates are connected at intervals by bolts and shafts which support the several rollers over which the two belts, known as "hugger belts" are trained. The upper belt is shown at 144 and the lower belt at 145. The two belts converge just beyond the end of the stripping plate 135 and run for a distance in parallelism to deliver the sheet of rubber to a skid or other receptacle. At the points where the belts converge and later diverge, spring-loaded pressure rollers 147 exert sufficient pressure on the stock to draw it through the take-off mechanism.

The belts are driven from the main power unit for the mill through a chain 150 which is trained over a sprocket 151 which drives a pinion 152 on a power shaft 153 mounted on the end frame 2. A belt and pulley, indicated at 155, drive one of the pulleys 156 over which the belt 145 is trained. A chain 157 connects the pulley 156 with a pulley 158, over which the upper belt 144 is trained.

The take-off mechanism is arranged so that it may be readily removed if its services are not required. For this purpose the frame 140 is attached at the end toward the mill to a clevis 162 by bolts 163 which enter a cross plate 164 welded between the lower edges of the side plates 141 and 142. A rock shaft 165 passes through the clevis 162 and through a bearing on a block 166 which is supported on the upper surface of the beam 48. Bolts 168 on either side of the block and having their heads in the channel 50 hold the clevis in place. Around the shaft 28 is fastened a second clevis 170, in the forked end of which is located a short shaft 171. A bolt 172 is threaded in the shaft, the shank of the bolt being passed through a shaft 174 located in the upper part of the frame 140. This holds the take-off unit in raised position.

Figure 17:
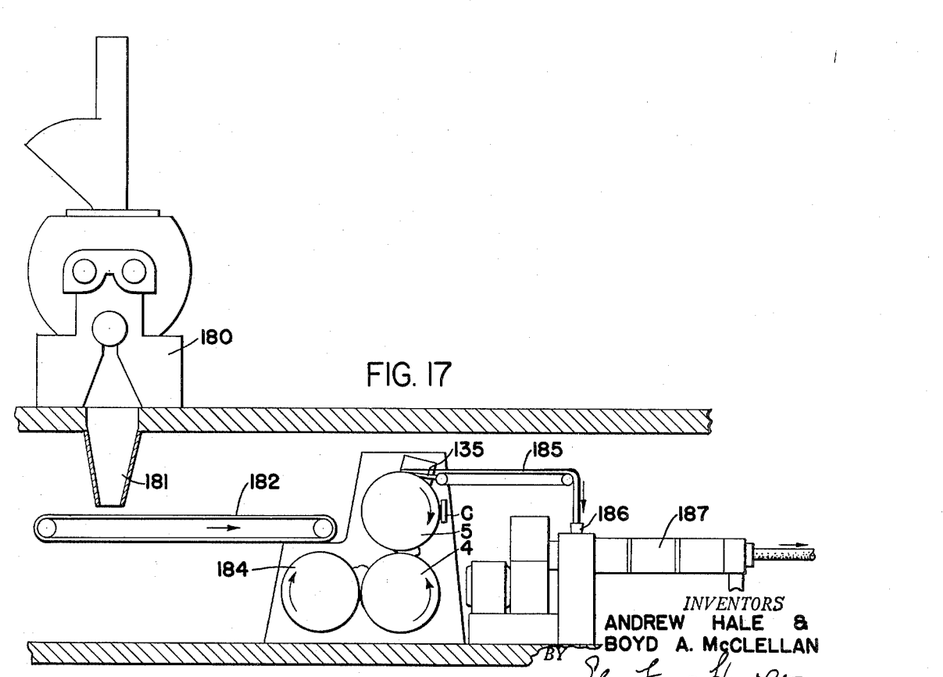
Fig. 17 is a view showing the manner in which the improved mill may be incorporated in a layout wherein the stock is taken directly from a Banbury mixer to the mill and thence to a tubing machine.

In Fig. 17 is illustrated diagrammatically how the automatic mill may be arranged as a part of an installation whereby the stock as it issues from a Banbury mixer may be taken directly to the continuous mill of this invention, by which it is thoroughly milled and then passed directly to further processing, for example to a tubing machine. The tubing machine may be a calender or any other machine for finally processing the stock.

Referring to Fig. 17, the numeral 180 represents diagrammatically a Banbury mixer of the well known type in which the gate discharges the stock which has been compounded therein through a chute 181 to a belt 182. The belt 182 delivers the stock between the roll 4 of the continuous mill of this application and an auxiliary roll 184 which would be located at the intake point on the mill and confined more or less to the limits defined by the feed box 14. As the stock is warmed and coherent, the casement is not needed in this operation. The stock would pass up onto the roll 5 and be moved progressively along the roll by the slitting and coiling units, a main coiling roll being indicated at C in this view. On the far side of the mill the completed stock will be taken off by the stripper plate 135 and delivered to a second belt 185, which deposits it in the hopper 186 of a tubing machine 187, which will impart the finished cross section to the stock.

An arrangement such as shown would enable rubber stocks to be processed continuously from the time they are originally compounded in the Banbury mixer until they are tubed. In lieu of the tuber, the stock could be delivered directly to a calender. It is possible, because of the repeated and vigorous milling operations performed on the improved mill of this invention, to avoid the intermediate aging and cooling, and warming up mills which have heretofore been essential in prior factory practices. The length of time in the Banbury may also be reduced.

The machine shown herein provides a novel and very efficient method of milling plastic materials which are subjected to milling operations prior to further steps by which the finished articles are made. As indicated above, particularly in the processing of rubber, the new mill is a substantial improvement because it is possible at a single pass through the mill to completely and thoroughly work the rubber without the intermediate cooling and aging steps which have heretofore been considered essential.

The uniformity of the milled stocks is one of the great assets of the machine for it is no longer necessary to have a mill operator cut back the stock from time to time, as has been the regular practice. Labor at the mill is eliminated and other advantages flow from the invention.

While the mill is shown as a single operation mill, it is possible to locate the intake portion of the mill at the center of the mill and to work the stock towards both ends.

What is claimed is:

1. A mill for stocks of plastic material, comprising a pair of rotating mill rolls one of which is a work roll to which the stock will cling, said rolls having a narrow bight at which the stock forms in a bank, means for feeding stock at one point along said rolls, and means for advancing the stock along the rolls comprising a knife to slit the stock on the work roll, means to pick up an edge of the stock and turn it upon itself, and a rotatable coiling roller having an end face presented to the surface of the work roll, said coiling roller being located between the turning means and the bight and acting upon the stock while it is on the work roll and adapted to roll the stock upon itself into a coil before it reaches the bank.

2. A mill for stocks of plastic material, comprising a pair of rotating mill rolls one of which is a work roll to which the stock will cling, said rolls having a narrow bight at which the stock forms in a bank, means for feeding stock at one point along said rolls, and means for advancing the stock along the rolls comprising a knife to slit the stock on the work roll, means to pick up an edge of the stock and turn it upon itself, and a rotatable coiling roller having an end face presented to the surface of the work roll, means to drive the coiling roller, said coiling roller bearing upon the stock while it is on the work roll and located between the turning means and the bight and adapted to roll the stock upon itself into a coil before it reaches the bank.

3. A mill for stocks of plastic material comprising a pair of rotating mill rolls, one of which is a work roll, said rolls having a narrow bight at which the stock forms in a bank, means located on the surface of the work roll to pick up an edge of the stock and turn it upon itself, and a coiling roller also located at the surface of the work roll between the turning means and the bight adapted to roll the stock upon itself against the surface of the work roll.

4. A mill for stocks of plastic material comprising a pair of rotating mill rolls, one of which is a work roll, said rolls having a narrow bight at which the stock forms in a bank, means located on the surface of the work roll to pick up an edge of the stock and turn it upon itself, a coiling roller also located at the surface of the work roll between the turning means and the bight adapted to roll the stock upon itself against the surface of the work roll, and means to drive said coiling roller.

5. A mill for stocks of plastic material, comprising a pair of rotating mill rolls, one of which is a work roll, said rolls having a narrow bight at which the stock forms in a bank, means to slit a sheet of stock on the work roll, a plow to lift the edge of the stock and turn it over, and a coiling roller between the plow and the bight having a working surface adjacent the surface of the work roller by which the turned over stock is rolled upon itself while it is on the work roll to form a convolute roll of stock.

6. A mill for stocks of plastic material, comprising a pair of rotating mill rolls, one of which is a work roll, said rolls having a narrow bight at which the stock forms in a bank, means to slit a sheet of stock on the work roll, a plow to lift the edge of the stock and turn it over, and a coiling roller between the plow and the bight having a beveled working surface on the edge of the roller and adjacent the surface of the work roller by which the turned over stock is rolled upon itself while it is on the work roll to form a convolute roll of stock.

7. A mill for stocks of plastic material, comprising a pair of rotating mill rolls, one of which is a work roll, said rolls having a narrow bight at which the stock forms in a bank, means to slit a sheet of stock on the work roll, a plow to lift the edge of the stock and turn it over, a coiling roller between the plow and the bight having a working surface adjacent the surface of the work roller by which the turned over stock is rolled upon itself to form a convolute roll of stock, said coiling roller having an axis radial to the work roll, and means to drive the coiling roller in a direction to deliver the convolute roll of stock endwise to the bight.

8. A mill for stocks of plastic material, comprising a pair of rotating mill rolls, one of which is a work roll, said rolls having a narrow bight at which the stock forms in a bank, means to slit a sheet of stock on the work roll, a plow to lift the edge of the stock and turn it over, a coiling roller between the plow and the bight having a flat working surface parallel to the surface of the work roll and adjacent the surface of the work roller by which the turned over stock is rolled upon itself to form a convolute roll of stock, said coiling roller having an axis radial to the work roll, and means to drive the coiling roller in a direction to deliver the convolute roll of stock endwise to the bight.

9. In a continuous mill for stocks of plastic material, a pair of rotating mill rolls one of which is a work roll, means for feeding stock to one point on the rolls, knives for slitting the sheet of stock on the work roll, a turning and coil forming mechanism adjacent each knife adapted to coil the edge of the stock upon itself into a convolute roll, each said mechanism comprising a coiling roller having a working face in substantial parallelism with the surface of the work roll and engaging the stock while it is on the work roll, said coiling roller delivering a convolute coil of stock endwise to the bight between the mill rolls, and means to remove the stock from the work roll after it passes said mechanisms.

10. In a continuous mill for stocks of plastic material, a pair of rotating mill rolls one of which is a work roll, means for feeding stock to one point on the rolls, knives for slitting the sheet of stock on the work roll, a turning and coil forming mechanism adjacent each knife adapted to coil the edge of the stock upon itself into a convolute roll, each said mechanism comprising a coiling roller having a working face in substantial parallelism with the surface of the work roll and engaging the stock while it is on the work roll, said coiling roller delivering a convolute coil of stock endwise to the bight between the mill rolls, means to remove the stock from the work roll after it passes said mechanisms, and means to drive the coiling roller so that its working surface moves with the work roll.

11. In a mill for working plastic material, said mill having a rotating work roll about which the material forms as a sheet, a disk-like coiling roller having a working face opposed to the surface of the work roll and bearing upon the stock while it is on the work roll, means to deliver a partially coiled edge of stock to the space between the work roll and the coiling roll.

12. In a mill for working plastic material, said mill having a rotating work roll about which the material forms as a sheet, a disk like coiling roller having a working face opposed to the surface of the work roll, said working face having a beveled edge, means to deliver a partially coiled edge of stock to the space between the work roll and the coiling roll.

13. In a mill for working plastic material, said mill having a rotating work roll about which the material forms as a sheet, a disk like coiling roller having a working face opposed to the surface of the work roll, means to deliver a partially coiled edge of stock to the space between the work roll and the coiling roll, and means to drive said coiling roll so that it propels the stock in the same direction as the work roll is moving.

14. In a mill for working plastic material, said mill having a rotating work roll about which the material forms as a sheet, a disk like coiling roller having a working face opposed to the surface of the work roll, said working face having a beveled edge, means to deliver a partially coiled edge of stock to the space between the work roll and the coiling roll, and means to drive said coiling roll so that it propels the stock in the same direction as the work roll is moving.

15. A mill in accordance with claim 11 in which a plurality of coiling rolls are located along the work roll.

16. A mill in accordance with claim 11 in which means are provided to feed stock at one point in the mill and to remove stock at another point on the mill and in which a plurality of coiling rolls are located along the work roll.

References Cited in the file of this patent

UNITED STATES PATENTS

| 1,100,768 | Olier | June 23, 1914 |
| 1,745,228 | Parsons | Jan. 28, 1930 |
| 1,787,661 | Bloch | Jan. 6, 1931 |
| 1,897,961 | Snyder | Feb. 14, 1933 |
| 2,011,685 | Maynard | Aug. 20, 1935 |
| 2,097,290 | Parkin | Oct. 26, 1937 |
| 2,341,651 | Raschig | Feb. 15, 1944 |
| 2,593,282 | Engler | Apr. 15, 1952 |
| 2,652,590 | Sullivan et al. | Sept. 22, 1953 |

FOREIGN PATENTS

| 886,266 | France | June 28, 1943 |